United States Patent [19]

Mulder

[11] Patent Number: 4,472,451
[45] Date of Patent: Sep. 18, 1984

[54] MOLD MASKING APPARATUS AND METHOD

[75] Inventor: Douglas C. Mulder, Wellington, Ohio

[73] Assignee: Nordson Corporation, Amherst, Ohio

[21] Appl. No.: 459,834

[22] Filed: Jan. 21, 1983

[51] Int. Cl.³ .......................... B05B 5/02; B05D 1/06
[52] U.S. Cl. ...................... 427/28; 118/301;
  118/308; 118/326; 425/98; 425/112; 427/29;
  427/135; 427/282
[58] Field of Search ................... 427/28, 29, 133, 135,
  427/282; 118/301, 308, 326; 425/90, 98, 100, 112

[56] References Cited

U.S. PATENT DOCUMENTS

| Re. 28,068 | 7/1974 | Lemelson . | |
|---|---|---|---|
| 2,946,696 | 7/1960 | Lopenski | 427/282 |
| 2,953,483 | 9/1960 | Torok | 427/282 |
| 3,278,656 | 10/1966 | Dicks et al. . | |
| 3,296,999 | 1/1967 | Gamble . | |
| 3,504,063 | 3/1970 | Lemelson . | |
| 3,672,927 | 6/1972 | Spiller et al. | 427/28 |
| 3,695,909 | 10/1972 | Fabre et al. | 118/301 |
| 3,791,846 | 2/1974 | Nuehring . | |
| 3,839,990 | 10/1974 | Nuehring . | |
| 3,917,790 | 11/1975 | Oswitch et al. . | |
| 3,918,401 | 11/1975 | Blakeslee . | |
| 3,928,668 | 12/1975 | Snow . | |
| 4,025,660 | 5/1977 | Crose et al. . | |
| 4,109,027 | 8/1978 | Crose . | |
| 4,125,088 | 11/1978 | Hong et al. . | |
| 4,168,676 | 9/1979 | Itoh . | |
| 4,205,028 | 5/1980 | Bruehhemann et al. . | |
| 4,228,113 | 10/1980 | van Gasse . | |
| 4,291,640 | 9/1981 | Payne et al. . | |
| 4,331,735 | 5/1982 | Shanoski . | |

FOREIGN PATENT DOCUMENTS 2079667  1/1982  United Kingdom ................ 427/133

Primary Examiner—John H. Newsome
Attorney, Agent, or Firm—Wood, Herron & Evans

[57] ABSTRACT

A method and apparatus is disclosed for powder coating the interior surface of a heated mold cavity. Electrostatically charged powder is sprayed upwardly onto the interior surface of a mold surrounded by a mask. The mask includes a shield located adjacent to but spaced from the shear edge of the mold. Additionally, the mask includes a vacuum duct located beneath the shield. While air is drawn into the vacuum duct air is either blown through the slot defined between the shield and the mold shear edge or air is pulled into the slot so as to prevent oversprayed powder from coming into contact with and adhering to the shear edge of the mold. There is no enclosure surrounding the mold cavity other than the mask because rising heated air currents entrap and maintain the cloud of sprayed powder interiorly of the mold cavity and the surrounding mask. Any oversprayed material escaping from the cavity is caught in the vacuum duct and carried to a powder collector.

45 Claims, 4 Drawing Figures

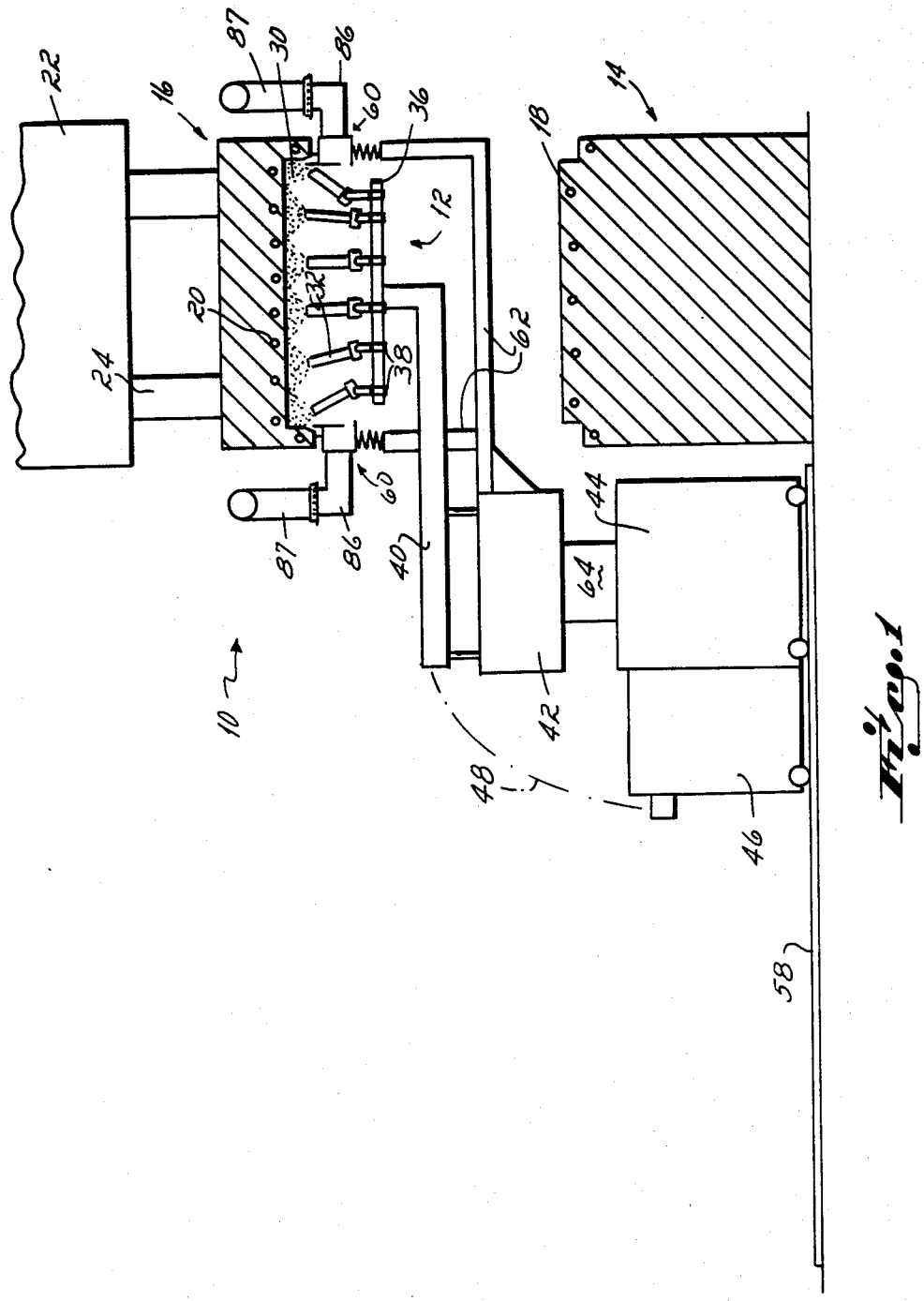

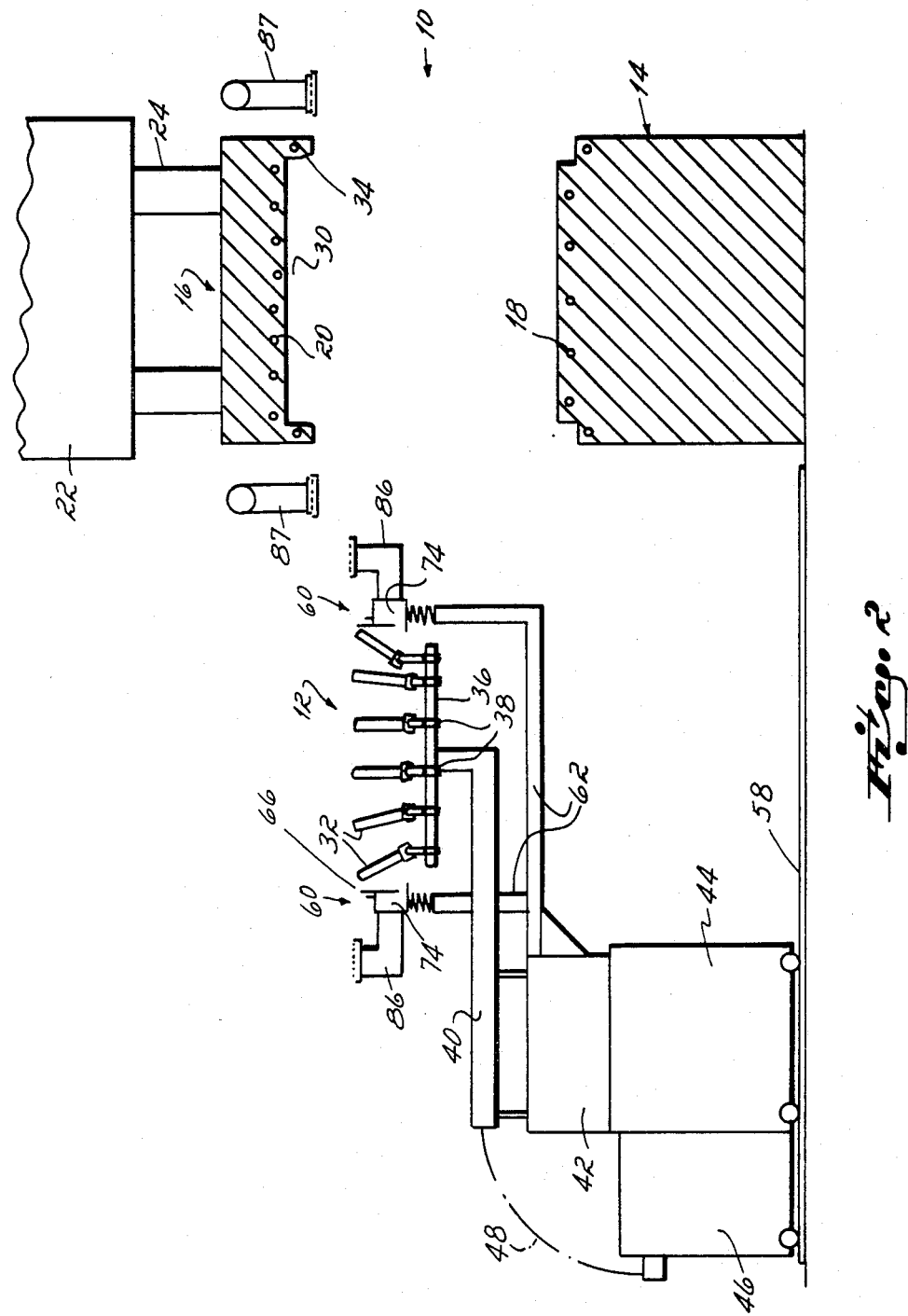

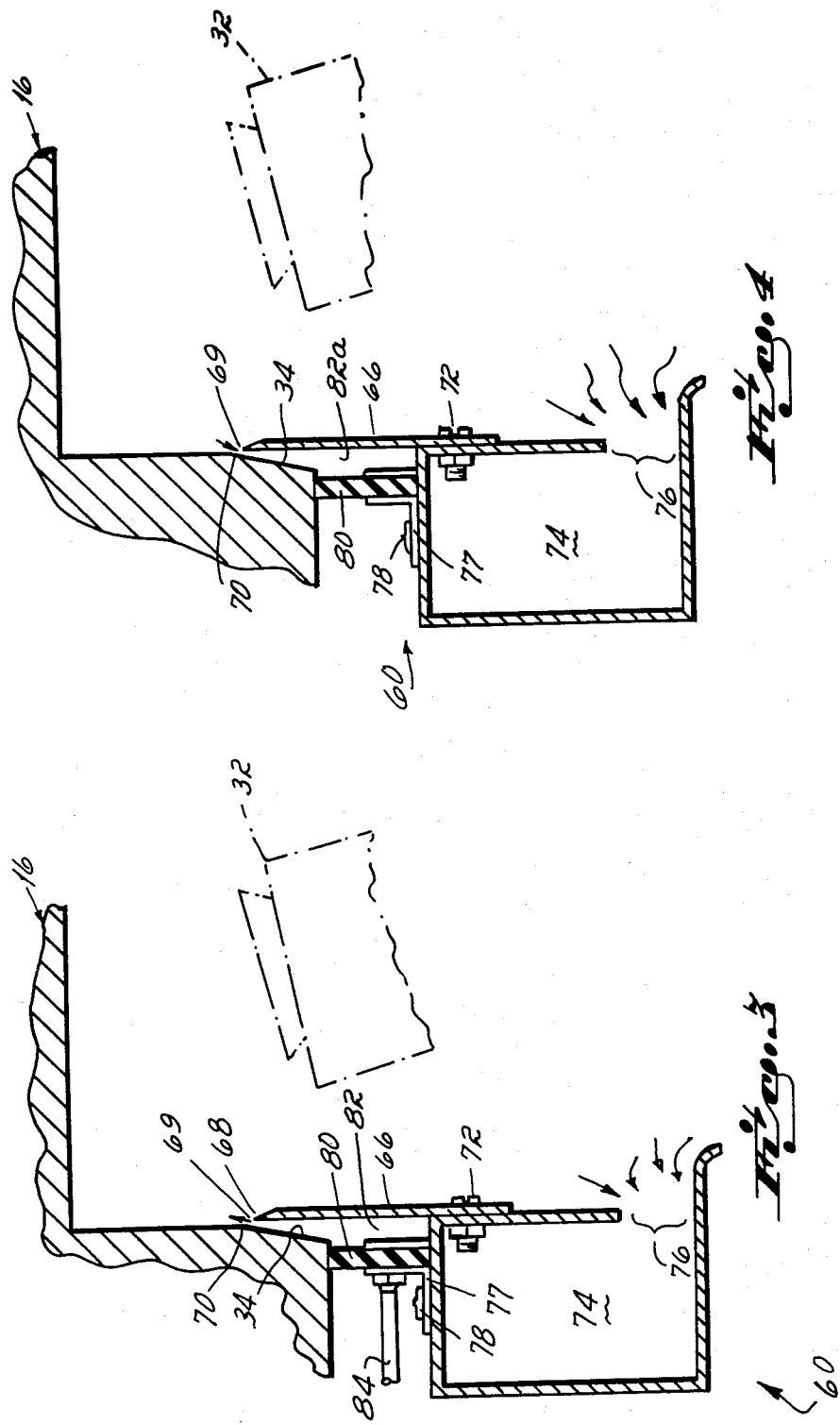

MOLD MASKING APPARATUS AND METHOD

It is now common practice to mold sheet molding compound, often referred to as SMC within pressurized molds. Such parts are commonly manufactured from bulk resin material having very substantial fiber content. This molding technique is widely used for high volume production of large plastic parts. A characteristic of parts molded from sheet molding compounds though is that they have very poor surface quality with the result that substantial labor is required to complete the finishing operation. Examples of surface imperfections characteristic of such molded parts which require additional finishing operations are sink marks, porosity, waviness, pits, dimples and the like in the surface of the molded product. Such surface imperfections are corrected by manually sanding or smoothing the surface of the product, filling the sink marks or pits with additional resin and then coating the surface with appropriate coating materials to disguise the imperfections.

In an effort to reduce the manual labor required to disguise these surface imperfections, it has been proposed to coat the mold interior surface with a coating which when the mold is subsequently filled with sheet molding compound and that compound is cured, forms a surface coating on the resulting product. The proposed coating is a powdered thermosetting resin which is sprayed onto the heated interior surface of the mold before the mold is filled. The heat of the mold, which is at a temperature on the order of 250°F. and 350°F. melts the powder, causing it to flow and then to partially set or cure. When a sheet molding compound or bulk resin is subsequently added to the mold and the mold is heated to cure the bulk resin, the resin of the coating as well as the bulk resin cure so as to interract the two resins in to one integral product having a smooth attractive outer surface or skin.

Present proposed practice is to spray the thermosetting powder material while entrained in an air stream onto the heated interior surface of the mold. Such powder is usually electrostatically charged as it is emitted from a spray gun and is sprayed onto the mold which is grounded so that the electrical charge on the powder holds the powder material to the surface of the mold.

This process and technique for molding sheet molding compound and for applying a powder coating skin to the resulting product is described in U.S. Pat. No. 4,205,028. This patent also describes a thermosetting resin powder suitable for use in the practice of this process.

In the spraying of powder coating materials, a problem occurs in confining the sprayed powder to the mold cavity and in preventing the build-up of the powder on hot surfaces of the mold external of the mold cavity. Such molds commonly have shear edges at the interface of the male and female halves of the mold, and it is these shear edges which are particularly vulnerable to becoming coated with a build-up of sprayed powder material. Any build-up of course must be manually removed from the mold in order to enable the halves of the mold to close properly.

It has therefore been an objective of this invention to provide a method and apparatus for protecting the shear edge of a mold surface from becoming coated with electrostatically sprayed powder material directed onto the interior surface of a mold.

Still another objective of this invention has been to provide a method and apparatus for powder coating the interior surface of a mold without exposing the exterior surface of the mold to contact with the sprayed powder.

Still another objective of this invention has been to provide a method and apparatus for powder coating the interior surface of a mold while maintaining a sharp line of demarcation between the powder spray coated mold interior surface and the exterior surface as well as the shear edge of the mold which are to remain uncoated and free of electrostatically charged powder material.

The invention of this application which accomplishes these objectives comprises a mask in the form of a shield having a knife edge placed in close proximity to but spaced from the shear edge of a mold. During the spraying of an electrostatically charged powder onto the interior surface of the mold an air stream is directed through a slot defined between the shear edge of the mold and the knife edge of the shield. This air stream protects the shear edge of the mold from becoming coated and prevents undesirable build-up of powder coating material on the shear edge of the mold. In the preferred embodiment, the shield is attached to a pressure duct which also has a flexible baffle secured thereto. The flexible baffle is placed in contact with the hot mold surface outside of the shear edge so as to define a chamber through which an air stream is directed so as to prevent contact of air suspended powder with the shear edge of the mold. Simultaneously, air is withdrawn from the interior of the mold through a vacuum duct located beneath the shield so as to prevent build-up of powder on the knife and baffle and to prevent escape of powder from the interior of the mold into the surrounding atmosphere.

The primary advantage of this invention is that it provides a method and apparatus for maintaining the shear edge of a mold free of contact with powder sprayed onto the interior surface of a mold. This mask also has the advantage of being so constructed that powder does not build up on the mask and baffle.

Still another advantage of the invention is that in a preferred embodiment it enables resinous powder to be sprayed onto the interior surface of a heated mold without the need for a shroud or booth for containment of the spray guns through which the powder is sprayed onto the mold. By spraying the powder upwardly onto the heated interior surface of the mold and by placing a vacuum duct around the mold interior surface, the need for a shroud or powder spray containment is eliminated. The rising air moving upwardly into the interior of the heated mold carries any air entrained powder upwardly with it into contact with the heated mold surfaces, the temperature of which is sufficient to cause the powder to fuse and remain on the mold interior surface. Any powder escaping from the interior of the mold moves over the outer edges of the mold and becomes entrapped in the air stream pulled from the mold's interior surface into the vacuum duct. In the preferred embodiment there is thus no need for a catch basin or shroud beneath the spray guns.

It is of course within the scope of this invention to provide a catch basin or shroud around the powder spray guns to catch oversprayed powder, although in at least one embodiment of this invention, such a shroud is not required.

It is within the scope of this invention to utilize the apparatus and method of this invention in association with molding processes other than sheet molding compound processes, as for example injection molding, compression molding rotational molding, pour molding, etc. It is also within the scope of this invention to use this method and apparatus to shield other powders, as for example metals, ceramics, non-metallics, thermoplastic resins as well as thermosetting resins and combinations thereof from a sprayed surface, whether this surface is heated or is a portion of a mold.

In the spraying of any powder onto a target, one of the most severe problems has always been that of maximizing the percentage of sprayed powder which adheres to the target. In an effort to increase that percentage it is common practice to apply an electrostatic charge to the powder as it emerges from a spray gun and to ground the target so that the electrostatic charge of the powder enhances attachment of the powder to the target. Even when an electrostatic charge is applied to the powder, it is common to have 30% or more of the sprayed powder avoid or fall from the target and become overspray. Generally, this overspray must then be collected and reused in order to make the coating process economical. Whether the powder is reused or not, it must be contained so as to avoid its entering and contaminating the atmosphere surrounding the spray area. Quite commonly, the cost of containing the powder in a booth or some form of enclosure, and the cost of collecting the oversprayed powder, is substantially greater than the cost to spray the powder initially.

It has therefore been another objective of this invention to provide an improved method and apparatus for applying powder coating to the target which enhances the percentage of sprayed powder which attaches to the target.

Still another objective has been to provide a powder spray method and apparatus which eliminates the need for spraying the powder within a booth or enclosure.

These objectives are accomplished and yet another aspect of this invention is predicated upon the discovery of a novel method and apparatus for spraying powder onto a target objective without the need for a booth or closure for preventing oversprayed powder from escaping to the atmosphere. I have discovered that if air entrained powder is sprayed upwardly onto the underside of a surface to be coated within an atmosphere of upwardly rising heated air currents and if a vacuum is drawn through a vaccum duct located around the area to be coated, an object or target may be sprayed without the need for a booth or closure surrounding the spray guns. When sprayed in this upwardly rising air current atmosphere any oversprayed powder becomes entrained in the upwardly rising air steam and is carried into contact with the surface to be coated. Any powder which might escape to the atmosphere surrounding the object must flow outwardly over the vacuum duct and is caught up in the air flow into the vacuum duct. Consequently, there is very little if any powder which escapes to atmosphere even though the guns are not enclosed within a conventional spray booth or enclosure.

In the preferred embodiment the upwardly rising air currents are created by maintaining the surface of the object being sprayed at 250°-350° F. At this temperature air heated by the surface of the object being sprayed rises, creates an upward draft of air around the spray guns and toward the object being sprayed which is located above the spray guns.

This method and apparatus for spraying has the advantage of eliminating the need for a powder spray booth or enclosure surrounding the spray guns. Additionally, this method has been found to enhance the percentage of sprayed powder which attaches to the target.

These and other objects and advantages of this invention will become more readily apparent from the following description of the drawings in which:

FIG. 1 is a partially diagrammatic illustration of a sheet molding compound apparatus and mold coating apparatus incorporating the invention of this application.

FIG. 2 is a view similar to FIG. 1 but illustrating the mold coating apparatus as having been withdrawn to a position out of alignment with the mold preparatory to closure of the mold.

FIG. 3 is an enlarged cross sectional view of the mold masking portion of the apparatus of FIG. 1.

FIG. 4 is a view similar to FIG. 3 but of a modified form of masking apparatus.

Referring first to FIGS. 1 and 2 there is partially diagrammatically illustrated a molding apparatus 10 incorporating the novel powder spray apparatus 12 of this invention. The molding apparatus 10 is conventional for molding sheet molding compound. It comprises a mold base 14 cooperable with a molding unit or die 16 to form a cavity therebetween. In use, sheet molding compound is placed over the mold base and the die is closed relative to the base so as to create a die cavity therebetween. The mold and mold base are heated by conventional electrical resistance heaters 18, 20 in the base and die respectively so as to cure the compound contained within the die cavity. Generally the mold is heated to a temperature on the order of 250°-350° F. to effect curing of the sheet molding compound.

In the illustrated embodiment movement of the mold or die 16 relative to the mold base is effected by movement of the mold top 22 toward the mold base or by cylinders 24 in the mold top moving the die 16 toward the mold base. Whether the die 16 is moved by the cylinders 24 or by movement of the mold top is of no moment to the invention of this application since the mold and dies are all conventional and per se form no part of the invention of this application.

The invention of this application is concerned with a method and apparatus for coating the interior surface 30 of the molding unit or die 16 with a resinous powder coating sprayed onto the interior surface from spray guns 32. It has previously been proposed, and is well known in the art, that the powder spraying of a resinous powder material onto the interior surface 30 of the mold before the mold is closed has the effect of creating a coating upon the resulting sheet molding compound product which is superior to the surface otherwise created in the absence of the resinous powder. The application of this powder to the inside of the mold has been a problem though because of the powder overspray contacting and building upon the surface of the mold outside the mold cavity. This problem is particularly acute on the shear edge 34 of the mold. The shear edge is that portion of the mold or die which contacts a mating surface of the mold base so as to close and seal the mold cavity. The build-up of coating material upon the shear edge acts as a barrier to closing of the mold with the result that the molded product is improperly sized, shaped, etc.

The invention of this application employs multiple spray guns 32 adjustably mounted upon a gun support arm 36. These powder spray guns are operative to supply air entrained powder from the gun toward the surface 30 of the mold. In the illustrated embodiment multiple guns are employed so as to effect complete surface coverage of the interior surface of the mold. The guns 32 are conventional electrostatic spray guns mounted by means of conventional adjustable brackets 38 upon the supporting arm 36. In the use of such conventional guns very fine particulate powder material is sprayed from the guns and in the course of passage from the guns, has an electrostatic charge applied thereto. The mold or die to which the powder is applied is grounded so that the electrostatic charge on the powder causes the powder to contact and adhere to the mold. Upon coming into contact with the heated mold the powder melts or fuses and becomes partially cured as a coating over the interior surface of the mold.

In order to effect movement of the guns into vertical alignment with the underside of the mold cavity surface 30, the gun supporting arm 36 is mounted upon a vertically adjustable support 40. This support is in turn secured to a reciprocator 42 mounted upon hydraulic cylinders 64 of a movable base 44. The cylinders 64 are operative to effect vertical movement of the gun mounting support 40 and reciprocator relative to the moveable base 44. The movable base 44 is in turn mounted upon a track 58 for movement toward and away from the mold base 14.

Attached to the moveable base 44 is a powder feeder 46 operable to supply air entrained powder from a reservoir (not shown) contained interiorly of the feeder through a powder feed hose 48 to the guns 32. The powder feeder 46 and feed hose for supplying air entrained powder to the guns are conventional and are well known in the powder spray art and therefore have not been described in detail in this application.

The movable base 44 and attached powder feeder are movable upon the track 58 between an inner position illustrated in FIG. 1 wherein the guns 32 are vertically aligned with the mold cavity and an outer position illustrated in FIG. 2 wherein the guns are out of alignment with the mold cavity such that the mold unit 16 may be closed without interference from the spray guns and powder spray unit 12.

In order to contain the powder sprayed from the guns 32 into the mold cavity and prevent that powder from escaping to atmosphere, there is a mask 60 located beneath and surrounding the spray guns 32. This mask 60 is mounted upon a mask support 62 attached to the reciprocator 42. The connection is such that when the reciprocator 42 is moved upwardly relative to the base 44 by the hydraulic cylinders or motors 64, the mask 60 moves with it. If spray guns 32 do not require movement after positioning in the mold, then the mask support and the gun mounting support may be combined.

With reference to FIG. 3, it will be seen that the mask 60 comprises a shield 66 which completely surrounds the mold cavity 30. The shield has an upper knife edge 68 located adjacent to but spaced from the upper end 70 of the mold shear edge 34. In a preferred embodiment the knife edge 68 of the shield 66 is spaced approximately 0.040 inch from the shear edge 34 of the mold, but the dimensions of this slot may vary from approximately 0.020 inch to 0.050 inch.

The shield 66 is attached at its lower ends by means of a series of bolts 72 to the inside edge of a vacuum duct 74. This vacuum duct has an inlet port 76 of the same configuration as the shield 66 through which air may be pulled or withdrawn from the mold cavity.

Mounted atop the vacuum duct 74 there is flexible baffle or seal 80 which surrounds the mold cavity and contacts the mold just outside the shear edge 34 of the mold. This baffle is connected to the top edge of the duct by a series of L-shaped brackets 77 and connectors 78. Between the baffle 80 and shield 66 there is an air chamber 82. Air at a pressure greater than atmosphere is supplied to this chamber through an air line 84. In one preferred embodiment air is supplied to this chamber at a pressure of approximately 8 psi.

In use, the powder spray system 10 is moved from a withdrawn position illustrated in FIG. 2 to a position of alignment with the mold illustrated in FIG. 1. After the powder supply system is moved into this aligned position with the mold cavity, the spray guns and attached mask 60 are moved upwardly by the reciprocator 42 to a position in which the spray guns 32 are located within the mold cavity and adjacent to the surface 30 of the molding unit. In the course of moving the mask 60 upwardly, the baffle 66 attached to the top of the vacuum duct 74 moves into sealed engagement with the underside of the molding unit 16. Simultaneously, vacuum conduits 86 open to the interior of the vacuum duct 74, move into sealed engagement with conduits 87 fixedly attached to the mold top and operatively connected to a conventional dust collector (not shown). With the guns and mask so located, air is supplied under pressure above that of the atmosphere to the pressure chamber 82 so as to direct an air stream from the pressure chamber 82 through the slot 69 into the interior of the mold. The air pressure stream moving from this slot maintains a sufficient air flow to preclude air entrained powder within the mold cavity from moving through the slot into contact with the shear edge 34 of the mold 16.

Simultaneously with the supply of air to the pressure chamber 82, a vacuum is drawn through the conduits 86 connected to the vacuum duct 74. While this vacuum is maintained, the spray guns are turned on so as to direct a stream of air entrained, electrostatically charged powder toward the inside surface 30 of the mold cavity. The mold or die 16 is at this time at a temperature about 200° F. and preferably at a temperature on the order of 300° F. At this temperature electrostatically charged powder emerges from the guns 32 and moves into contact with the grounded surface 30 of the mold. Upon contact with the mold, the powder fuses and becomes partially cured.

Not all electrostatically charged powder sprayed from the guns 32 moves directly to the grounded surface 30 of the mold or die 16. Some of the powder becomes entrained in the air surrounding the guns to form a dust cloud interiorly of the mask 60 and the mold cavity defined by the surface 30 of the mold. This dust cloud though is conveyed by upwardly moving air currents toward the surface 30 of the mold. The upwardly moving air currents are created by convection of rising hot air created by the relatively high temperature surface of the mold 16.

It has been found that with the temperature of the mold 16 above 200° F., air heated by the mold tends to rise and this rising air creates drafts which maintain very nearly all of the sprayed powder within the mold cavity and the surrounding mask 60. Any powder in the cloud of powder within the mold cavity which is not forced into contact with the mold cavity by the upwardly moving air drafts is carried outwardly over the surface of the mask where it is picked up and pulled into the vacuum duct 68 before it can escape to the atmosphere below the mask. Even though the underside of the spray gun including the gun support arm are at atmospheric pressure, there is very little tendency for powder to fall from the cloud of powder contained within the mold cavity to the top surface of the mold base. Even if some minimal amount of the powder does fall onto the mold though, it is of no consequence since it will fuse and cure on the top surface of the mold base and subsequently be molded into the molded product when the mold is subsequently closed and filled with bulk resin.

After the surface 30 of the mold or die 16 has been completely coated with sprayed powder, the spray of powder from the guns 32 is terminated and the guns 32 and mask 60 lowered and then moved outwardly on the track 58 to a position out of alignment with the mold unit or die 16. Thereafter, the mold is filled with sheet molding compound and the die closed. The resin contained in the sheet molding compound is then cured by heating of the mold. In the course of curing the sheet molding compound, the resin of the powder coating contained within the mold cavity reacts with the resin of the sheet molding compound to form an integral molded product.

With reference now to FIG. 4, there is illustrated a second embodiment of the invention of this application. In this embodiment the elements which are identical to the embodiment of FIGS. 1-3 have been identically numbered. This second embodiment of FIG. 4 is identical to the embodiment of FIGS. 1-3 except that in this second embodiment, the chamber 82a is connected to a vacuum rather than to a source of air pressure above atmospheric pressure. Consequently, in this second embodiment, air is pulled from the mold cavity into the chamber 82a rather than being blown from the chamber. This air pulled into the chamber 82a carries with it some electrostatically charged powder, but the velocity of the air stream moving through the slot 69 between the knife edge 68 and shear edge 34 is sufficient to prevent the electrostatically charged powder from adhering to the shear edge. Consequently, any powder pulled into the chamber 82a may be evacuated into the dust collector system while the shear edge is maintained free of sprayed powder.

A primary advantage of the invention of this application is that it enables the shear edge of a mold to be maintained free of powder while the interior surface of a mold surrounding that mold edge is coated with a resinous sprayed powder.

Another advantage of this invention is that it provides a method of spraying powder onto a surface without the need for enclosing the spray guns from which powder is sprayed within a powder spray booth or enclosure. The air currents rising from the heated mold are sufficient to maintain the sprayed powder within the mold cavity and a surrounding surface without the need for a spray booth or enclosure. The obvious advantage of this spraying technique is that is eliminates the need for a powder spray booth. But this technique also minimizes the safety hazards associated with powder spraying of resinous material. A possibility exists in the spraying of electrostatically charged resinous materials that a spark from the electrostatically charged apparatus will cause the powder to catch fire. In the practice of this invention, the freedom of mounting fire detection equipment is facilitated to such an extent that the fire hazards usually associated with a powder spray booth are minimized.

While I have described only two embodiments of my invention, persons skilled in this art will appreciate numerous modifications and changes which may be made without departing from the spirit of my invention. Therefore, I do not intend to be limited except by the scope of the following appended claims.

I claim:

1. Apparatus for coating a molded article comprising,
    a first mold member,
    a second mold member movable into engagement with said first mold member,
    said molds having facing wall portions defining a cavity when said mold members are assembled in which cavity an article may be shaped,
    apparatus for depositing a powder material against a selected portion of the wall of at least one of said mold members defining a cavity,
    said depositing apparatus including a spray gun and means for flowing said powder material from said spray gun while entrained in an air stream,
    said second mold member being retractable from and movable close against said first mold member,
    a mount for said spray head,
    means for moving said mount to align and misalign said spray gun with said first mold member,
    means for masking the selected portion of the wall of said first mold member from the portion of the wall surrounding said selected portion, said masking means comprising,
    a shield having an edge movable into close proximity to but spaced from said surrounding wall portion so as to define a slot therebetween, and
    means for directing an air stream through said slot so as to prevent electrostatically charged powder from adhering to said surrounding portion of said mold.

2. The apparatus of claim 1 wherein said masking means includes a baffle engageable with said surrounding wall portion, said baffle and said shield defining an enclosed chamber therebetween.

3. The apparatus of claim 2 wherein said means for directing an air stream through said slot includes means for pressurizing said enclosed chamber to a pressure greater than atmosphere.

4. The apparatus of claim 2 wherein said means for directing an air stream through said slot includes means for drawing a vacuum through said enclosed chamber so as to draw air entrained powder into said enclosed chamber.

5. The apparatus of claim 2 which further includes a vacuum duct adjacent said shield.

6. The apparatus of claim 1 wherein said slot is defined in part by a knife edge on said shield.

7. The apparatus of claim 1 wherein said baffle is made of a flexible material operable to establish a pressure seal between said baffle and said first mold member.

8. The apparatus of claim 1 wherein said first mold member is a heated mold maintained at a temperature operable to melt and fuse said powder upon contact with said powder.

9. A method of protecting the shear edge of a mold surface from being coated with electrostatically charged powder material sprayed onto the interior cavity surface of the mold, which method comprises, masking the shear edge of the mold from the mold interior surface by locating an edge of a shield in close proximity to but spaced from the inside of the shear edge of the mold, said shield edge defining a slot between said shield and said shear edge of said mold, directing an air stream through said slot so as to prevent electrostatically charged powder from adhering to said shear edge of said mold.

10. The method of claim 9 which further includes placing a sealing baffle in contact with said mold outside of said shear edge of said mold, said baffle and shield defining an air chamber therebetween.

11. The method of claim 10 wherein said air stream is directed from said air chamber through said slot into the interior of said mold.

12. The method of claim 10 wherein said air stream is directed into said air chamber through said slot from the interior of said mold.

13. The method of claim 9 which further includes locating a vacuum duct around said interior surface of said mold in close proximity to said shear edge and
withdrawing powder entrained air through said vacuum duct.

14. A method of spraying electrostatically charged powder onto a selected portion of a heated surface of an object while maintaining the portion of the surface of the object outside of said selected portion free of said powder, which method comprises, masking the portion of the heated surface of the object outside of said selected portion by locating an edge of a shield in close proximity to but spaced from the edge of said selected portion of said heated surface, said shield edge defining a slot between said shield and the outer edge of said selected portion of said surface, directing an air stream through said slot so as to prevent electrostatically charged powder from contacting and adhering to said portion of said surface outside of said selected portion, spraying air entrained electrostatically charged powder upwardly onto said selected portion of said heated surface while maintaining said selected portion of said heated surface open to the atmosphere, locating a vacuum duct beneath said shield, said vacuum duct having a port of approximately the same profile as said shield, and withdrawing oversprayed air entrained powder through said port of said vacuum duct.

15. The method of claim 14 which further includes placing a sealing baffle in contact with said portion of said surface of the object outside of said selected portion, said baffle and shield defining an air chamber therebetween.

16. The method of claim 15 wherein said air stream is directed from said air chamber through said slot.

17. The method of claim 15 wherein said air stream is directed into said air chamber through said slot.

18. A method of spraying electrostatically charged powder onto a selected portion of a surface of an object while maintaining the portion of the surface of the object outside of said selected portion free of said powder, which method comprises, masking the portion of the surface of the object outside of said selected portion by locating an edge of a shield in close proximity to but spaced from the edge of said selected portion of said surface, said shield edge defining a slot between said shield and the edge of said selected portion of said surface of said object, directing an air stream through said slot so as to prevent electrostatically charged powder from contacting and adhering to said portion of said surface outside of said selected portion, spraying air entrained electrostatically shaped powder upwardly onto said selected portion of said surface while maintaining said selected portion of said surface open to the atmosphere, locating a vacuum duct beneath said shield, said vacuum duct having a port of approximately the same profile as said shield, and withdrawing oversprayed air entrained powder through said port of said vacuum duct.

19. The method of claim 16 which further includes maintaining an upwardly directed air flow from beneath said selected portion of said surface.

20. The method of claim 17 wherein said upwardly directed air flow is effected by convection air currents moving heated air upwardly into contact with said selected portion of said surface.

21. The method of claim 18 which further includes placing a sealing baffle in contact with said portion of said surface of the object outside of said selected portion, said baffle and shield defining an air chamber therebetween.

22. The method of claim 21 wherein said air stream is directed from said air chamber through said slot.

23. The method of claim 21 wherein said air stream is directed into said air chamber through said slot.

24. A method of spraying electrostatically charged powder onto a selected portion of a heated surface of an object while maintaining the portion of the surface of the object outside of said selected portion free of said powder, which method comprises, masking the portion of the heated surface of the object outside of said selected portion by locating a shield around the edge of said selected portion of said heated surface, locating a vacuum duct beneath said shield, said vacuum duct having a port of approximately the same profile as said shield, spraying air entrained electrostatically charged powder upwardly onto said selected portion of said heated surface while maintaining said selected portion of said heated surface open to the atmosphere, and withdrawing oversprayed air entrained powder through said port of said vacuum duct.

25. The method of claim 24 which further comprises maintaining said selected portion of said heated surface of said object at a temperature of at least 200° F. so as to create an upward air draft toward said selected portion of heated surface.

26. A method of spraying electrostatically charged powder onto a selected portion of a surface of an object while maintaining the portion of the surface of the object outside of said selected portion free of said powder, which method comprises, separating the portion of the surface of the object outside of said selected portion from said selected portion by locating a mask around the edge of said selected portion of said surface of said object, locating a vacuum duct beneath said mask, said vacuum duct having a port of approximately the same profile as said mask, spraying air entrained electrostatically charged powder upwardly onto said selected portion of said surface while maintaining said selected portion of said surface open to the atmosphere, and withdrawing oversprayed air entrained powder through said port of said vacuum duct.

27. The method of claim 26 which further includes maintaining an upwardly directed air flow from beneath said selected portion of said surface.

28. The method of claim 27 wherein said upwardly directed air flow is effected by convection air currents moving heated air upwardly into contact with said selected portion of said surface.

29. Apparatus for protecting the shear edge of a mold surface from being coated with electrostatically charged powder material sprayed onto the interior cavity surface of the mold, which apparatus comprises, means for masking the shear edge of the mold from the mold interior surface, which masking means comprises a shield located in close proximity to but spaced from the inside of the shear edge of the mold, said shield having an edge defining a slot between said shield and said shear edge of said mold, and means for directing an air stream through said slot so as to prevent electrostatically charged powder from adhering to said shear edge of said mold.

30. The apparatus of claim 29 which further includes a sealing baffle contacting said mold outside of said shear edge of said mold, said baffle and shield defining an air chamber therebetween.

31. The apparatus of claim 30 wherein said air stream directing means is operable to direct an air stream from said air chamber through said slot into the interior of said mold.

32. The apparatus of claim 30 wherein said air stream directing means is operable to direct an air stream into said air chamber through said slot from the interior of said mold.

33. The apparatus of claim 29 which further includes a vacuum duct located around said interior surfaces of said mold in close proximity to said shear edge and means for withdrawing powder entrained air through said vacuum duct.

34. Apparatus for spraying electrostatically charged powder onto a selected portion of a heated surface of an object while maintaining the portion of the surface of the object outside of said selected portion free of powder, which apparatus comprises, means for masking the portion of the heated surface of the object outside of said selected portion, said masking means comprising a shield having an edge in close proximity to but spaced from the edge of said selected portion of said heated surface, said shield edge defining a slot between said shield and the outer edge of said selected portion of said surface, and means for directing an air stream through said slot so as to prevent electrostatically charged powder from contacting an adhering to said portion of said surface outside of said selected portion, means for spraying air entrained electrostatically charged powder upwardly onto said selected portion of said heated surface while maintaining said selected portion of said heated surface open to the atmosphere, a vacuum duct located beneath said shield, said vacuum duct having a port of approximately the same profile as said shield, and means for withdrawing oversprayed air entrained powder through said port of said vacuum duct.

35. The apparatus of claim 34 which further includes a sealing baffle in contact with said portion of said surface of the object outside of said selected portion, said baffle and shield defining an air chamber therebetween.

36. The apparatus of claim 35 wherein said air stream directing means is operable to direct said air stream from said air chamber through said slot.

37. The apparatus of claim 35 wherein said air stream directing means is operable to direct said air stream into said air chamber through said slot.

38. Apparatus for spraying electrostatically charged powder onto a selected portion of surface of an object while maintaining the portion of the surface of the object outside of said selected portion free of said powder, which apparatus comprises, means for masking the portion the surface of the object outside of said selected portion from the selected portion, which masking means comprises a shield having an edge in close proximity to but spaced from the edge of said selected portion of said surface, said shield edge defining a slot between said shield and the edge of said selected portion of said surface of said object, and means for directing an air stream through said slot so as to prevent electrostatically charged powder from contacting and adhering to said portion of said surface outside of said selected portion, means for spraying air entrained electrostatically charged powder upwardly onto said selected portion of said surface while maintaining said selected portion of said surface open to the atmosphere, a vacuum duct located beneath said shield, said vacuum duct having a port of approximately to same profile as said shield, and means for withdrawing oversprayed air entrained powder through said port of said vacuum duct.

39. The apparatus of claim 38 further includes means for maintaining an upwardly directed air flow from beneath said selected portion of said surface.

40. The apparatus of claim 39 wherein said upwardly directed air flow is effected by convection air currents moving heated air upwardly into contact with said selected portion of said surface.

41. Apparatus for spraying electrostatically charged powder onto a selected portion of a heated surface of an object while maintaining the portion of the surface of the object outside of said selected portion free of said powder, which apparatus comprises, a shield located around the edge of said selected portion of said heated surface, a vacuum duct located beneath said shield, said vacuum duct having a port of approximately the same profile as said shield, means for spraying air entrained electrostatically charged powder upwardly onto said selected portion of said heated surface while maintaining said selected portion of said heated surface open to the atmosphere, and means for withdrawing oversprayed air entrained powder through said port of said vacuum duct.

42. The apparatus of claim 41 which further comprises means for maintaining said selected portion of said heated surface of said object at a temperature of at least 200° F. so as to create an upward air draft toward said selected portion of heated surface.

43. Apparatus for spraying electrostatically charged powder onto a selected portion of a surface of an object while maintaining the portion of the surface of the object outside of said selected portion free of said powder, which apparatus comprises a mask around the edge of said selected portion of said surface of said object, a vacuum duct located beneath said mask, said vacuum duct having a port of approximately the same profile as said mask, means for spraying air entrained electrostatically charged powder upwardly onto said selected portion of said surface while maintaining said selected portion of said surface open to the atmosphere, and means for withdrawing oversprayed air entrained powder through said port of said vacuum duct.

44. The apparatus of claim 43 which further includes means for maintaining an upwardly directed air flow from beneath said selected portion of said surface.

45. The apparatus of claim 44 wherein said upwardly directed air flow is effected by convection air currents moving heated air upwardly into contact with said selected portion of said surface.

* * * * *

UNITED STATES PATENT AND TRADEMARK OFFICE
CERTIFICATE OF CORRECTION

PATENT NO. : 4,472,451

DATED : September 18, 1984

INVENTOR(S) : Douglas Cornelius Mulder

It is certified that error appears in the above-identified patent and that said Letters Patent is hereby corrected as shown below:

Col. 7, line 60, the second "is" should be -- it --

Col. 11, line 62, Claim 34, "an" should be -- and --

Col. 12, line 17, Claim 38, after "of" first occurrence insert -- a --

Col. 12, line 21, Claim 38, after "portion" insert -- of --

Col. 12, line 38, Claim 38, "to" should be -- the --

Col. 12, line 43, Claim 39, after "38" insert -- which --

Signed and Sealed this

Second Day of April 1985

[SEAL]

Attest:

DONALD J. QUIGG

*Attesting Officer*  Acting Commissioner of Patents and Trademarks